(12) United States Patent
Koc

(10) Patent No.: US 7,711,273 B2
(45) Date of Patent: May 4, 2010

(54) OPTICAL QUADRATURE-AMPLITUDE MODULATION RECEIVER

(75) Inventor: Ut-Va Koc, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1003 days.

(21) Appl. No.: 11/367,108

(22) Filed: Mar. 3, 2006

(65) Prior Publication Data

US 2007/0206963 A1    Sep. 6, 2007

(51) Int. Cl.
H04B 10/06    (2006.01)

(52) U.S. Cl. .................. 398/202; 398/205; 398/206; 398/208; 398/188; 385/14; 385/15; 359/245

(58) Field of Classification Search ............... 398/202, 398/203, 204, 205, 206, 207, 208, 209, 210, 398/211, 212, 213, 214, 188, 183; 385/14, 385/15; 359/245
See application file for complete search history.

(56) References Cited

U.S. PATENT DOCUMENTS

| 4,732,447 | A | 3/1988 | Wright et al. | 350/96.16 |
| 5,077,531 | A | 12/1991 | Takeuchi et al. | 329/304 |
| 5,515,197 | A | 5/1996 | Hooijmans et al. | 359/189 |
| 6,038,267 | A | 3/2000 | Oura et al. | 375/329 |
| 6,473,222 | B2* | 10/2002 | Hait et al. | 359/326 |
| 7,266,310 | B1 | 9/2007 | Savory et al. | 398/205 |
| 7,327,913 | B2* | 2/2008 | Shpantzer et al. | 385/15 |
| 2007/0036555 | A1* | 2/2007 | Chen et al. | 398/188 |
| 2007/0092259 | A1* | 4/2007 | Bontu et al. | 398/147 |

FOREIGN PATENT DOCUMENTS

| EP | 0 451 289 A1 | 10/1991 |
| GB | 2 259 419 A | 3/1993 |

OTHER PUBLICATIONS

U.S. Appl. No. 10/204,607, filed Aug. 15, 2005, Chen et al.
"Coherent Optical QPSK Intradyne System: Concept and Digital Receiver Realization," by Frowin Derr, Journal of Lightwave Technology, vol. 10, No. 9, Sep. 1992, pp. 1290-1296.

(Continued)

*Primary Examiner*—Hanh Phan
(74) *Attorney, Agent, or Firm*—Mendelsohn, Drucker & Associates, P.C.; Yuri Gruzdkov; Steve Mendelsohn

(57) ABSTRACT

In one embodiment, a receiver of the invention has an optical detector coupled to a digital processor. The optical detector is adapted to mix the received optical quadrature-amplitude modulation (QAM) signal with an optical local oscillator (LO) signal having a time-varying phase offset with respect to the carrier frequency of the QAM signal to produce two digital measures of the QAM signal. The digital processor is adapted to: (i) determine the amplitude and phase differentials for each QAM-symbol transition based on these digital measures; (ii) adjust each phase differential for an amount of phase drift associated with the time-varying phase offset; (iii) map each QAM-symbol transition onto a constellation point of a 2D decision map using the transition's amplitude differential and adjusted phase differential; and (iv) based on the mapping results, recover the data encoded in the optical QAM signal.

34 Claims, 7 Drawing Sheets

OTHER PUBLICATIONS

"Significant Performance Advantage of Electroabsorption Modulator Integrated Distributed Feedback Laser (EML) Transmitter in Transporting Multicarrier QAM Signals," by Naresh Chand, et al., Journal of Lightwave Technology, vol. 19, No. 10, Oct. 2001, pp. 1462-1468.

"Unrepeated optical transmission of 20 Gbit/s quadrature phase-shift keying signals over 210 km using homodyne phase-diversity receiver and digital signal processing," by Ly-Gagnon, D.-S. et al., Electronics Letters, vol. 41, No. 4, 2 pages, Feb. 17, 2005.

"Phase Noise-Tolerant Synchronous QPSK/BPSK Baseband-Type Intradyne Receiver Concept With Feedforward Carrier Recovery," by Noe, R., Journal of Lightwave Technology, vol. 23, No. 2, pp: 802-808, Feb. 2005.

"PLL-Free Synchronous QPSK Polarization Multiplex/Diversity Receiver Concept With Digital I&Q Baseband Processing," by Noe, R., IEEE Photonics Technology Letters, vol. 17, No. 4, pp. 887-889, Apr. 2005.

"Numerically Stable Direct Least Squares Fitting of Ellipses," by Halir, R. et al., Department of Software Engineering, Charles University, Malostranske nam. 2/25, 118 00 Prague, Czech Republic, 8 pages, 1998.

"Coherent Detection Method Using DSP for Demodulation of Signal and Subsequent Equalization of Propagation Impairments," by Taylor, Michael G., IEEE Photonics Technology Letters, vol. 16, No. 2, pp. 674-676, Feb. 2004.

"Digital Coherent Quadrature Phase-Shift-Keying (QPSK)", by U. Koc et al., OThI1.pdf, Optical Society of America, 2006, 3 pages.

"Coherent Demodulation of 40-Gbit/s Polarization-Multiplexed QPSK Signals with 16-GHz Spacing after 200-km Transmission" by Satoshi Tsukamoto et al., PDP29, Optical Society of America, 2005, XP-010833521, 3 pages.

"Direct Least Squares Fitting of Ellipses", by Andrew W. Fitzgibbon et al., IEEE Transactions on Pattern Analysis and Machine Intelligence, vol. 21, No. 5, 1999, pp. 476-480.

* cited by examiner $A_4$ $A_8$ $A_{16}$

OPTICAL QUADRATURE-AMPLITUDE MODULATION RECEIVER

CROSS-REFERENCE TO RELATED APPLICATIONS

The subject matter of this application is related to that of U.S. patent application Ser. No. 11/204,607, filed on Aug. 15, 2005, and entitled "Coherent Phase-Shift-Keying," which is incorporated herein by reference in its entirety.

BACKGROUND OF THE INVENTION

1. Field of the Invention

The present invention relates to optical communication equipment and, more specifically, to equipment for coherent detection of optical quadrature-amplitude modulation (QAM) signals.

2. Description of the Related Art

Delivery of multimedia services (e.g., telephony, digital video, and data) that is implemented using optical phase-shift keying (PSK) signals or optical M-ary quadrature-amplitude modulation (M-QAM) signals has certain advantages, e.g., over that implemented using conventional electrical analog or digital signals. More specifically, some of the advantages are: the ability to carry various/multiple multimedia services over the same optical communication channel; the ability to maintain a selected bit-error rate (BER) with relatively low carrier-to-noise ratios; relatively high tolerance to nonlinear signal distortions; and relatively high spectral efficiency and transmission capacity. As a result, cable companies are upgrading their hybrid fiber coaxial (HFC) networks to improve/create a fully interactive, bidirectional optical network that can carry optical multimedia signals into and out of homes. It is projected that, in the near future, high definition television (HDTV) signals are likely to be delivered substantially exclusively over optical communication channels.

A typical coherent optical QAM receiver detects the received optical communication signal by mixing it with a local oscillator (LO) signal and processing the mixing results to determine the phase and amplitude of the communication signal in each time slot, thereby recovering the encoded data. To enable this phase and amplitude determination, the LO signal is typically phase-locked to the carrier wavelength of the communication signal using an optical phase-lock loop (PLL). More specifically, the PLL is configured to track the frequency and phase of the carrier wavelength and provide a feedback signal to the LO source, based on which feedback signal the LO source achieves and maintains the phase-lock.

Unfortunately, suitable coherent optical receivers are typically relatively difficult to design and/or relatively expensive to build. For example, a conventional, relatively inexpensive laser source might produce an optical signal that has a relatively large linewidth. If that laser source is used in a coherent optical receiver as an LO source, then its relatively large linewidth might produce a phase uncertainty/noise that can make the optical phase-lock between the LO and communication signals difficult to achieve and/or maintain. As a result, coherent optical receivers are often designed to have specially constructed laser sources and/or relatively complex optical PLLs, both of which can drive up the receiver cost by a substantial amount.

SUMMARY OF THE INVENTION

Problems in the prior art are addressed by various embodiments of a coherent receiver adapted to recover data encoded in a received optical quadrature-amplitude modulation (QAM) signal using an optical local oscillator (LO) signal that does not have to be phase-locked to the carrier frequency of the QAM signal and might have a relatively large linewidth. In one embodiment, a receiver of the invention has an optical detector coupled to a digital processor. The optical detector is adapted to mix the received optical QAM signal with an optical LO signal having a time-varying phase offset with respect to the carrier frequency of the QAM signal to produce two digital measures of the QAM signal. In a typical configuration, these two digital measures substantially represent the real and imaginary components, respectively, of the QAM signal in the complex plane defined with respect to the LO signal. The digital processor is adapted to: (i) determine the amplitude and phase differentials for each QAM-symbol transition based on the digital measures; (ii) adjust each phase differential for an amount of phase drift associated with the time-varying phase offset; (iii) map each QAM-symbol transition onto a constellation point of a 2D decision map using the transition's amplitude differential and adjusted phase differential; and (iv) based on the mapping results, recover the data encoded in the optical QAM signal.

According to one embodiment, the present invention is a receiver for an optical QAM signal, comprising: (A) an optical detector having an optical source adapted to generate an optical LO signal, said optical detector adapted to mix said optical QAM signal with said optical LO signal to produce first and second digital measures of the QAM signal, wherein the first and second digital measures correspond to different phases of the optical LO signal; and (B) a digital processor coupled to the optical detector and adapted to process the first and second digital measures in response to a time-varying phase offset between a carrier frequency of the QAM signal and the optical LO signal to recover data encoded in the optical QAM signal.

According to another embodiment, the present invention is a method of processing an optical QAM signal, comprising: (A) mixing said optical QAM signal with an optical LO signal to produce first and second digital measures of the QAM signal, wherein the first and second digital measures correspond to different phases of the optical LO signal; and (B) processing the first and second digital measures in response to a time-varying phase offset between a carrier frequency of the QAM signal and the optical LO signal to recover data encoded in the optical QAM signal.

According to yet another embodiment, the present invention is a receiver for an optical QAM signal, comprising: (A) an optical detector adapted to mix the optical QAM signal with an optical LO signal to produce first and second digital measures of the QAM signal; (B) a differentiator circuit coupled to the optical detector and adapted to determine an amplitude differential and a phase differential for a QAM-symbol transition based on the first and second digital measures; (C) an angular adjustor coupled to the differentiator circuit and adapted to adjust the determined phase differential in response to a time-varying phase offset between a carrier frequency of the QAM signal and the optical LO signal; and (D) a decoding circuit coupled to the differentiator circuit and the angular adjustor and adapted to recover data encoded in the optical QAM signal based on the determined amplitude differential and the adjusted phase differential.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Figure 1A:
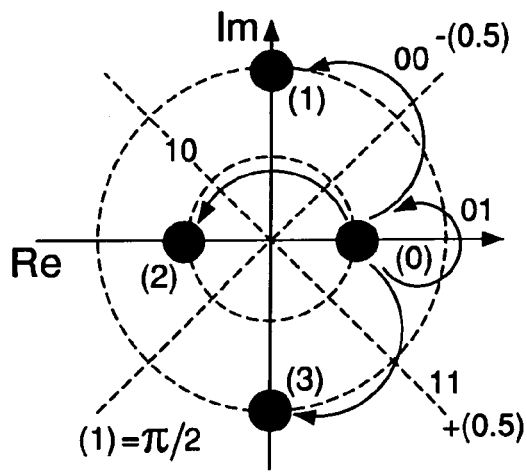
FIGS. 1A-C graphically show three representative QAM constellations that can be used in various embodiments of the invention.
Figure 1B:
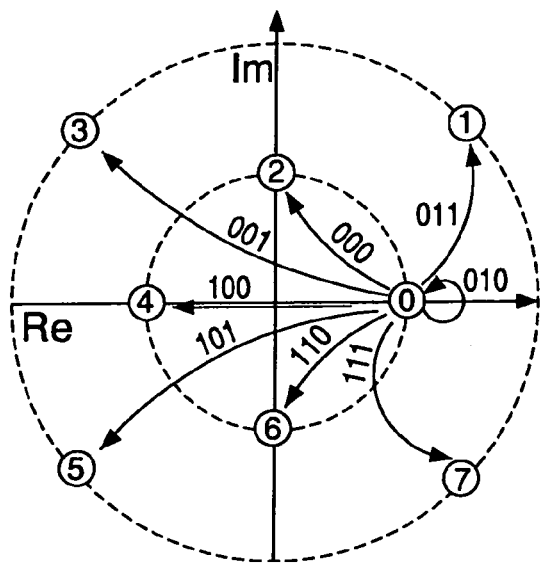
Figure 1C:
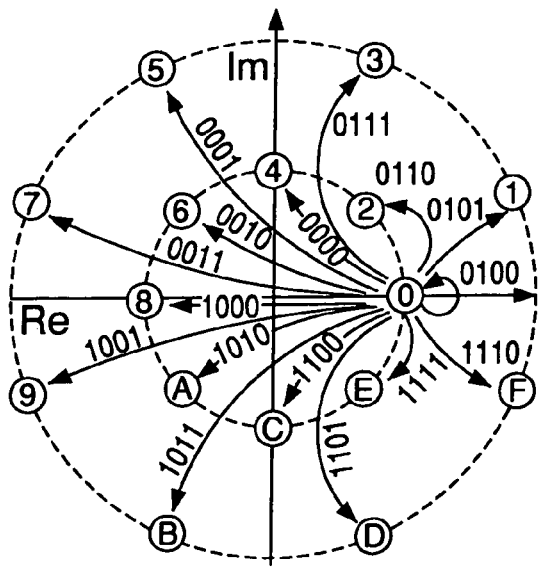

FIGS. 1A-C graphically show three representative two-layered QAM constellations that can be used in various embodiments of the invention. More specifically, FIG. 1A graphically shows a symbol set and transition diagram for a two-layered 4-QAM constellation; FIG. 1B graphically shows a symbol set and transition diagram for a two-layered 8-QAM constellation; and FIG. 1C graphically shows a symbol set and transition diagram for a two-layered 16-QAM constellation.

Referring to FIG. 1A, symbol set $A_4$ of the two-layered 4-QAM constellation has four symbols labeled (0) through (3) that are described by Eq. (1):

$$A_4 = \pm 1, \pm 2j \qquad (1)$$

where symbols (0) and (2) lie on the real (Re) axis of the complex plane, and symbols (1) and (3) lie on the imaginary (Im) axis of the complex plane. Symbols (0) and (2) represent the first layer of the 4-QAM constellation, and symbols (1) and (3) represent the second layer of that constellation. Using the constellation of FIG. 1A, data are encoded in a differential manner by assigning a particular two-bit value to each transition between the constellation symbols. The arrows in FIG. 1A illustratively show four possible transitions that involve symbol (0) as a start state, with the assigned binary values indicated next to the respective arrows. For example, the (0)→(1) transition is assigned a binary value of 00. Similarly, the (0)→(2) and (0)→(3) transitions are assigned binary values of 10 and 11, respectively. Finally, the (0)→(0) transition is assigned a binary value of 01. A transition diagram for transitions that originate at any one of symbols (1), (2), and (3) can be obtained from the shown transition diagram using the following principles: (i) the binary value assigned to a transition between two constellation symbols is invariant with respect to the transition direction and (ii) transitions characterized by the same absolute value of the amplitude increment and the same absolute value of the phase increment are assigned the same binary value.

Referring to FIG. 1B, symbol set $A_8$ of the two-layered 8-QAM constellation has eight symbols labeled (0) through (7) that are described by Eq. (2):

$$A_8 = e^{jk\pi/2}, 2e^{j(k+0.5)\pi/2}; k=0,\ldots,3 \qquad (2)$$

The even symbols of symbol set $A_8$ represent the first layer of the 8-QAM constellation, lie at the complex-plane-axis intersections with a unit circle, and are separated from one another by 90 degrees. The odd symbols of symbol set $A_8$ represent the second layer of the 8-QAM constellation, lie on a circle having a radius of two at the points that are equidistant from the complex-plane axes, and are also separated from one another by 90 degrees.

Using the 8-QAM constellation of FIG. 1B, data are also encoded in a differential manner by assigning a particular binary value to each transition between the symbols. However, one difference between the 4-QAM and 8-QAM constellations is that, in the latter, each binary value is a three-bit value, as opposed to a two-bit value in the former. The arrows in FIG. 1B illustratively show eight possible transitions that involve symbol (0) as a start state, with the assigned binary values indicated next to the respective arrows. A transition diagram for transitions that originate at any one of the remaining symbols can be obtained from the shown transition diagram using the above-specified two principles, i.e., (i) the binary value assigned to a transition between two constellation symbols is invariant with respect to the transition direction and (ii) transitions characterized by the same absolute value of the amplitude increment and the same absolute value of the phase increment are assigned the same binary value.

Referring to FIG. 1C, symbol set $A_{16}$ of the two-layered 16-QAM constellation has sixteen symbols labeled (0) through (9) and (A) through (F) that are described by Eq. (3):

$$A_{16} = e^{jk\pi/4}, 2e^{j(k+0.5)\pi/4}; k=0,\ldots,7 \qquad (3)$$

The 16-QAM constellation of FIG. 1C is analogous to the 4-QAM and 8-QAM constellations of FIGS. 1A-B in that its symbols lie on two circles, the first circle having a radius of one and the second circle having a radius of two. In particular, the even symbols of symbol set $A_{16}$ (i.e., symbols (0), (2), (4), (6), (8), (A), (C), and (E)) represent the first layer of the 16-QAM constellation, lie on the first circle, and are separated from one another by 45 degrees. Similarly, the odd symbols of symbol set $A_{16}$ (i.e., symbols (1), (3), (5), (7), (9), (B), (D), and (F)) represent the second layer of the 16-QAM constellation, lie on the second circle, and are also separated from one another by 45 degrees. Note, however, that the even symbols are oriented with respect to the complex-plane axes such that four of them lie at the intersection points of the first circle with the complex-plane axes, while the odd symbols are oriented such that there are no odd symbols at the four intersection points of the second circle with the complex-plane axes and each of those four intersection points is equidistant from the respective two adjacent odd symbols.

Similar to the 4-QAM and 8-QAM constellations of FIGS. 1A-B, the 16-QAM constellation of FIG. 1C is used to encode data in a differential manner by assigning a particular binary value to each transition between the symbols. However, in the 16-QAM constellation, each binary value is a four-bit value. The arrows in FIG. 1C illustratively show sixteen possible transitions that involve symbol (0) as a start state, with the assigned binary values indicated next to the respective arrows. A transition diagram for transitions that originate at any one of the remaining symbols can be obtained from the shown transition diagram using the same two principles as those specified above for the 4-QAM and 8-QAM constellations of FIGS. 1A-B.

Figure 2:
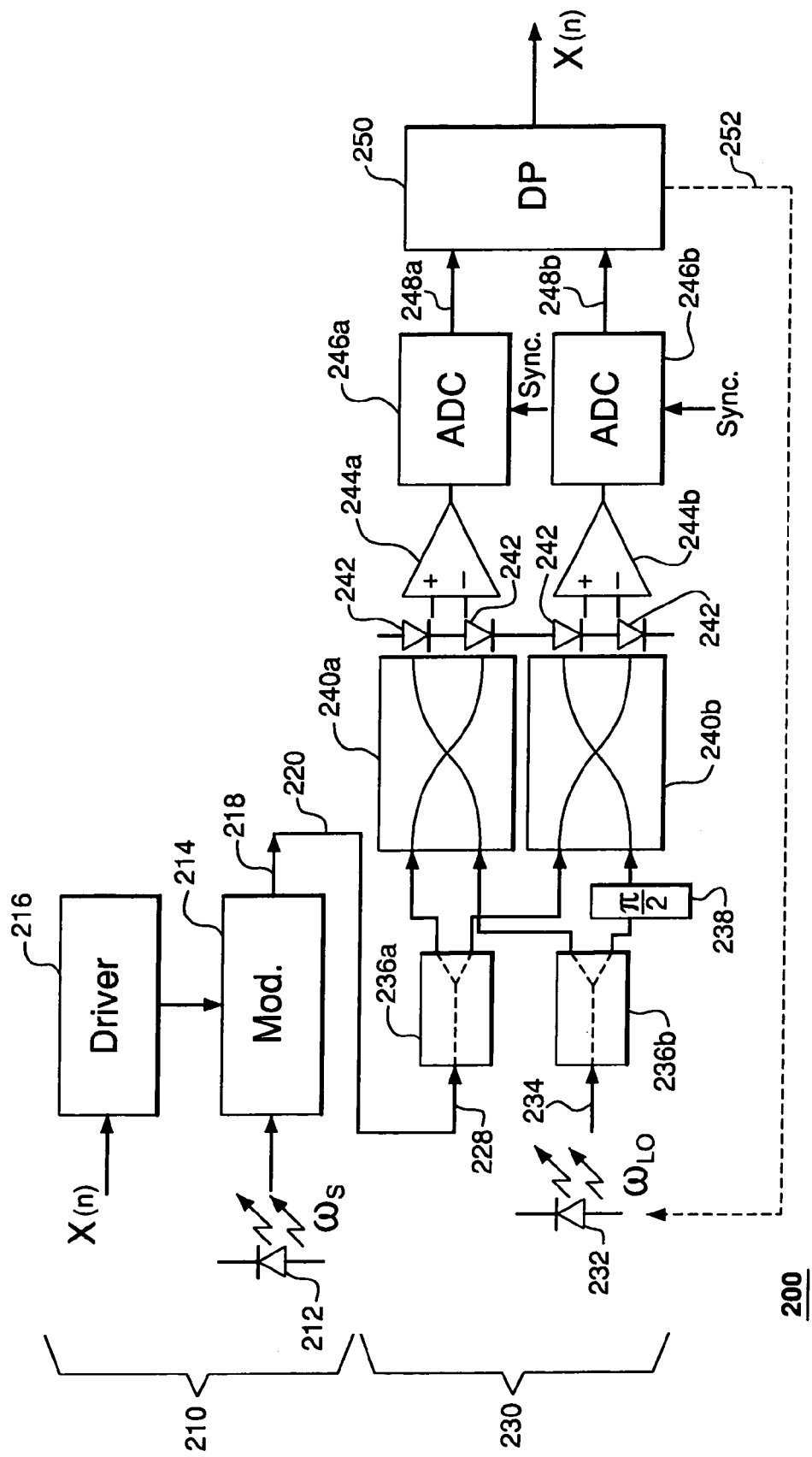
FIG. 2 shows a block diagram of a communication system according to one embodiment of the invention.

FIG. 2 shows a block diagram of a communication system 200 according to one embodiment of the invention. System 200 has a transmitter 210 and a receiver 230 coupled via an optical communication link 220. Transmitter 210 has an optical source (e.g., a laser) 212 coupled to an optical modulator (OM) 214, which is controlled by a driver 216. Driver 216 receives a binary input sequence X(n), transforms it into a sequence of constellation symbols, e.g., using a selected one of the QAM constellations shown in FIGS. 1A-C, and generates a control signal that is applied to OM 214 to produce an optical QAM signal 218 that carries that symbol sequence.

After propagating through link 220, signal 218 is received at receiver 230 as signal 228, which is then split into first and second copies in a splitter 236a. A local oscillator (LO) signal 234, which is produced at receiver 230 by an optical source (e.g., a laser) 232, is similarly split into first and second copies in a splitter 236b. The first copy of signal 228 and the first copy of signal 234 are then applied to an optical mixer 240a. The second copy of signal 228 and a phase-shifted copy of signal 234 are similarly applied to an optical mixer 240b, with the phase-shifted copy of signal 234 obtained from the second copy of signal 234 (produced by splitter 234b) by passing that copy through an optical phase shifter (OPS) 238. In a typical configuration, OPS 238 is configured to introduce a π/2 (i.e., 90-degree) phase shift. It is desirable for the phase shift introduced by OPS 238 to fall between 45 and 135 degrees, and it is preferred that said phase shift is between 75 and 105 degrees.

Each of optical mixers 240a-b is designed to combine its input signals to produce two interference signals, each having an intensity that is: (i) proportional to the intensities of the input signals and (ii) related to an instant phase offset between those input signals. More specifically, the interference signals produced by optical mixer 240 are such that the intensity difference between these interference signals is proportional to $\cos(\Delta\phi)$, where $\Delta\phi$ is the instant phase offset. A pair of balanced photodetectors 242 coupled to a respective one of differential amplifiers 244a-b continuously measures the intensity difference for the interference signals produced by the respective one of optical mixers 240a-b and applies the measurement results to a respective one of synchronized analog-to-digital converters (ADCs) 246a-b. Using these measurement results, each of ADCs 246a-b produces a respective one of digital signals 248a-b, both of which are applied to a digital processor (DP) 250.

Note that the above-described signal processing implemented in receiver 230 substantially causes digital signal 248a to be proportional to $I_{228} \cos(\Delta\theta)$, where $I_{228}$ is the instant intensity of signal 228 and $\Delta\theta$ is the instant phase offset between signals 228 and 234. Note also that, if OPS 238 introduces a π/2 phase shift, then the signal processing implemented in receiver 230 causes digital signal 248b to be substantially proportional to $I_{228} \sin(\Delta\theta)$. Thus, the signal processing implemented in receiver 230 substantially provides, in the form of digital signals 248a-b, instant measures of the real and imaginary components, respectively, of signal 228 in the complex plane defined with respect to LO signal 234.

The absence of a phase-lock between the carrier frequency (wavelength) of signal 228 and LO signal 234 generally manifests itself in that different instances of the same symbol carried by signal 228 fall onto different portions of the complex plane defined with respect to LO signal 234. More specifically, if a sufficiently large number of instances of the same symbol are received and mapped onto the complex plane, those instances form a substantially continuous circular band having a radius corresponding to the distance between the center of coordinates and the symbol position in the QAM constellation. For example, repetitive transmission of symbol (0) of the 4-QAM constellation (see FIG. 1A) will produce a circular band having a radius of one. Similarly, repetitive transmission of symbol (2) of the 4-QAM constellation will produce a circular band having a radius of one, which circular band will overlap with the circular band corresponding to symbol (0). Repetitive transmission of symbols (1) and (3) of the 4-QAM constellation (see FIG. 1A) will produce two overlapping circular bands having a radius of two. One consequence of this band overlapping is that the direct mapping, using digital signals 248a-b, of the received symbols onto the complex plane defined with respect to (not phase-locked) LO signal 234 does not enable appropriate symbol recognition and/or data extraction. As described in more detail below, DP 250 processes digital signals 248a-b such that, even in the absence of a phase-lock between signals 228 and 234, symbol transitions in communication signal 228 are ascertained to enable substantial reconstruction of the original binary sequence X(n).

In certain embodiments of receiver 230, DP 250 is optionally configured to generate a control signal 252 and apply that control signal to optical source 232 for the purpose of loosely controlling the frequency ($\omega_{LO}$) of that optical source. In one embodiment, based on control signal 252, optical source 232 is configured to adjust its frequency, e.g., such that $|\omega_{LO} - \omega_S| \leq \Delta\omega_0$, where $\omega_S$ is the carrier frequency of communication signal 228, and $\Delta\omega_0$ is a selected maximum frequency mismatch value. Keeping the frequency mismatch between signals 228 and 234 within certain bounds might be advantageous because, in the presence of a relatively large frequency mismatch, the magnitudes of the signals generated by photodetectors 242 become relatively low. As such, control signal 252 can help to maintain optimal performance of photodetectors 242. Note, however, that the feedback loop that provides control signal 252 is not designed to phase-lock optical source 232 to the carrier frequency of communication signal 228 (as would be the case in a PLL).

Figure 3:
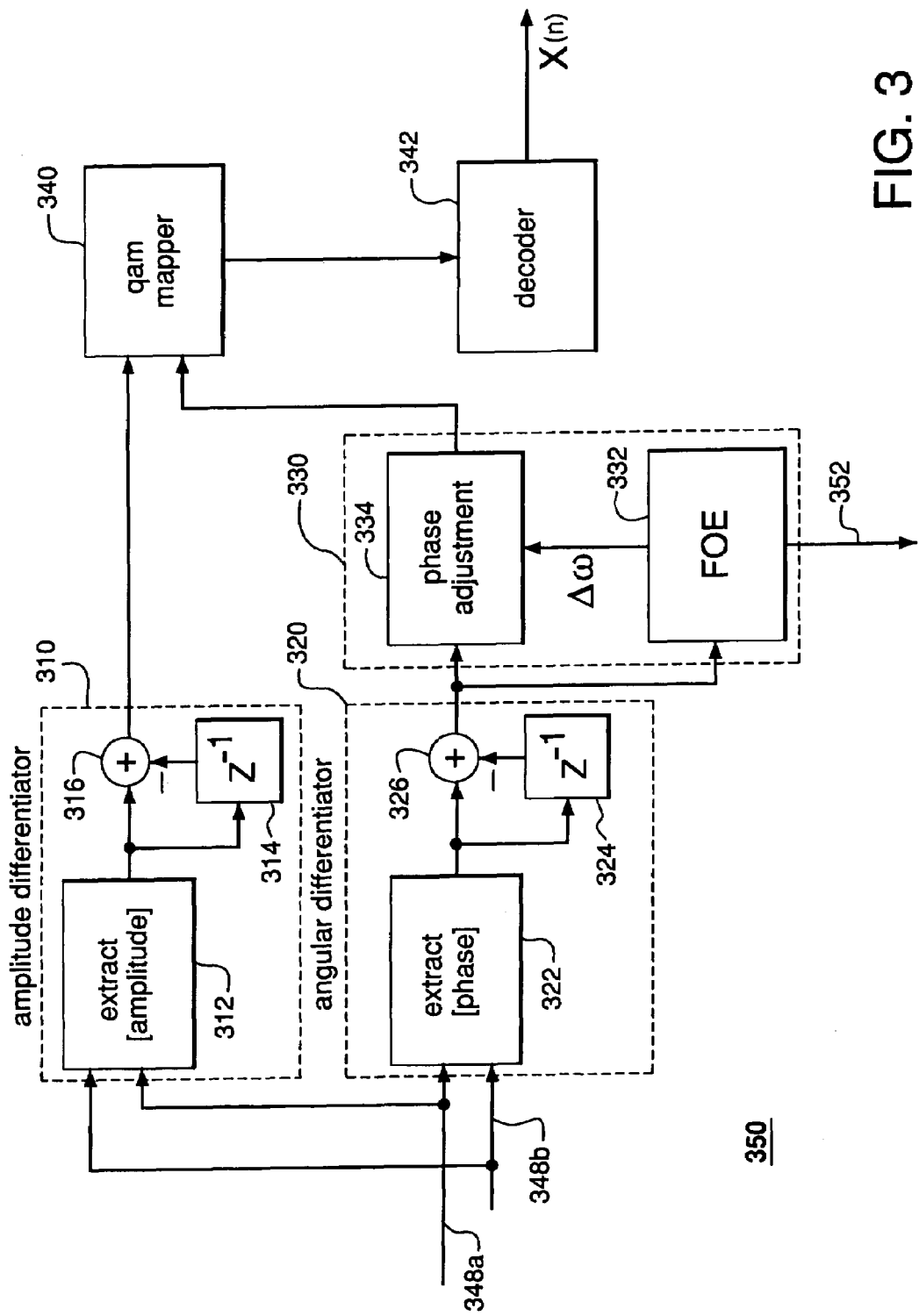
FIG. 3 shows a block diagram of a digital processor (DP) that can be used in the communication system of FIG. 2 according to one embodiment of the invention.

FIG. 3 shows a block diagram of a digital processor (DP) 350 that can be used as DP 250 (FIG. 2) according to one embodiment of the invention. DP 350 is configured to receive digital input signals 348a-b that are analogous to, e.g., digital signals 248a-b (see FIG. 2), respectively. In one configuration, signals 348a-b represent the real and imaginary parts, respectively, of communication signal 228 and can be expressed as follows:

$$y_{348}(t) = \alpha \{E_B(t) e^{j(\Phi_B + \Delta\omega t)} + N(t)\} \quad (4)$$

where: $y_{348}(t)$ is the complex value of signal 348 at time t; $\alpha$ is a conversion coefficient;

$$E_B(t) = \sum_n A_B(n) p(t - nT),$$

where $A_B(n)$ is the respective constellation symbol (e.g., from a selected one of constellations $A_4$, $A_8$, and $A_{16}$ of FIGS. 1A-C) in the n-th time slot, p(t) is the waveform envelope associated with each constellation symbol, and T is the symbol period (time-slot duration); $\Phi_W=\Phi_S+\Phi_{LO}$, where $\Phi_S$ is the linewidth-related phase noise in the communication signal (e.g., signal 228) and $\Phi_{LO}$ is the linewidth-related phase noise in the LO signal (e.g., signal 234); $\Delta\omega=\omega_{LO}-\omega_S$, and N(t) is the additive complex Gaussian noise.

Signals 348a-b are applied to an amplitude differentiator 310 and an angular differentiator 320. Amplitude differentiator 310 has an amplitude extractor 312 that is configured to compute, for each symbol period, the amplitude of signal 348, e.g., by (i) presenting the received value of $y_{348}$ (see Eq. (4)) in the form given by Eq. (5):

$$y_{348}(t)=r(t)e^{j\psi(t)} \quad (5)$$

where r(t) is the signal amplitude and $\psi(t)$ is the signal phase, and (ii) extracting the value of r(t). The extracted value of r(t) is then applied to a delay element ($Z^{-1}$) 314 and an adder 316. Delay element 314 delays the value of r(t) by one symbol period T, multiplies the delayed value by −1, and applies the result to adder 316. Adder 316 then sums the current value r(t) and the negative delayed value r(t−T), thereby computing an amplitude differential, dr(n)=r(n)−r(n−1), for each symbol transition.

Angular differentiator 320 has a phase extractor 322 that is configured to compute, for each symbol period, the phase of signal 348, e.g., by (i) presenting the received value of $y_{348}$ in the form given by Eq. (5) and (ii) extracting the value of $\psi(t)$. The extracted value of $\psi(t)$ is then applied to a delay element ($Z^{-1}$) 324 and an adder 326. Delay element 324 delays the value of $\psi(t)$ by one symbol period T, multiplies the delayed value by −1, and applies the result to adder 326. Adder 326 then sums the current value $\psi(t)$ and the negative delayed value $\psi(t-T)$, thereby computing a phase differential, $d\psi(n)=\psi(n)-\psi(n-1)$, for each symbol transition.

The output produced by angular differentiator 320 is applied to an angular adjustor 330. Angular adjustor 330 has a frequency offset estimator (FOE) 332 and a phase adjustor 334. FOE 332 is configured to compute and track the value of $\Delta\omega$. The speed at which FOE 332 computes and updates the value of $\Delta\omega$ is determined by the frequency offset drift rate, $d\Delta\omega/dt$. More specifically, FOE 332 is configured to accumulate a statistically sufficient number (determined by the frequency offset drift rate) of phase differentials $d\psi(n)$ and compute the value of $\Delta\omega$ under the assumption that: (i) for a sufficiently long pseudo-random bit sequence, the sum of $d\psi(n)$ is substantially zero and (ii) the mean of the linewidth-related phase noise $\Phi_W$ is also zero. As such, FOE 332 determines the cumulative phase differential over an appropriately long time interval and then computes the value of $\Delta\omega$ by simply dividing the determined cumulative phase differential by the duration of that time interval. In alternative embodiments, FOE 332 can be configured to use other suitable averaging methods to compute the value of $\Delta\omega$.

When DP 350 is initially brought online, FOE 332 is normally able to produce a first estimate of $\Delta\omega$ after a certain induction period, during which the FOE accumulates the phase-differential statistics. After that initial induction period, FOE 332 can be configured to update the value of $\Delta\omega$ as often as each symbol period using, e.g., a known sliding-window averaging method, in which a fixed number of most-recent phase differentials is used to calculate the cumulative phase differential value that goes into the frequency offset calculation. Based on the determined value of $\Delta\omega$, FOE 332 can optionally produce a control signal 352 that can be used as control signal 252 in receiver 230 (see FIG. 2). FOE 332 also supplies the determined value of $\Delta\omega$ to phase adjustor 334.

Similar to FOE 332, phase adjustor 334 is configured to receive the sequence of phase differentials $d\psi(n)$ produced by angular differentiator 320. Since normally $\Delta\omega\neq0$, each phase differential contains a frequency offset component that can be expressed as $\Delta\omega T$. Based on the value of $\Delta\omega$ received from FOE 332, phase adjustor 334 is configured to remove this frequency offset component from each phase differential to produce, for each symbol transition, a frequency-offset-adjusted phase differential. As shown in more detail below, the frequency-offset-adjusted phase differential, together with the corresponding amplitude differential, can be used to recover the encoded data.

The frequency-offset-adjusted phase differential and the amplitude differential produced by angular adjustor 330 and amplitude differentiator 310, respectively, are applied to a QAM mapper 340, which is configured to perform at least two functions. The first function of QAM mapper 340 is to form a two-dimensional (2D) decision map. The second function of QAM mapper 340 is to use the formed 2D decision map to sort symbol transitions in the received communication signal for data decoding in a decoder 342.

Referring to the first function of QAM mapper 340, the 2D decision map is constructed after the receiver (e.g., receiver 230) having DP 350 has received a sufficiently large number of symbols. QAM mapper 340 is configured to fold each frequency-offset-adjusted phase differential into a $2\pi$ range and plot each symbol transition as a point on a 2D plane, in which the point's x-coordinate is the folded phase differential value and the y-coordinate is the absolute value of the amplitude differential. As further illustrated below, the plotted symbol-transition points normally form clusters, the number of which corresponds to the number of different binary values assigned to various symbol transitions in the corresponding QAM constellation. For example, for the 4-QAM, 8-QAM, and 16-QAM constellations of FIGS. 1A-C, the plotted symbol-transition points form 4, 8, and 16 clusters, respectively. For each cluster, QAM mapper 340 determines a mean amplitude-differential value and a mean folded-phase-differential value, which mean values provide the coordinates of the respective constellation point on the 2D decision map. As such, the decision map for the 4-QAM, 8-QAM, and 16-QAM constellations of FIGS. 1A-C has 4, 8, and 16 constellation points, respectively. These constellation points of the 2D decision map are used to sort the symbol transitions of the communication signal and decode the data.

In one configuration, when DP 350 is initially brought online, QAM mapper 340 is typically configured to plot a relatively large number (e.g., 50) of symbol-transition points to obtain the initial coordinates of the constellation points on the 2D decision map. After the initial coordinates has been determined, QAM mapper 340 can be configured to continuously update the 2D decision map by recalculating the mean amplitude and folded-phase differential values corresponding to each cluster based, e.g., on the most recently received 100 symbol-transition points. As such, at any time after the initial start-up period, QAM mapper 340 maintains a current 2D decision map that is used for decoding information carried by the received communication signal.

In an alternative configuration, the initial coordinates of the constellation points on the 2D decision map are set in advance of the above-described calculation, e.g., based on the 2D decision map stored in the memory from the previous runs. These coordinates are then adjusted based on the data statistics collected on the fly during the current run substantially as described above. As a result, the receiver has a workable 2D decision map as soon as it is brought online, which 2D decision map is gradually improved to reflect the current channel/noise conditions.

Referring now to the second function of QAM mapper 340, the QAM mapper is configured to sort the received symbol-transition points by mapping each symbol-transition point onto one of the constellation points of the 2D decision map. In one representative configuration, QAM mapper 340 calculates the Euclidian distance between a received symbol-transition point and each of the constellation points. QAM mapper 340 then compares the calculated Euclidian distances to determine the shortest Euclidian distance. Finally, QAM mapper 340 assigns to the symbol-transition point a logical value associated with the constellation point corresponding to the shortest distance. If the symbol-transition point has the same (shortest) distance from two or more constellation points, then that symbol-transition point can be discarded as an error. Alternatively or in addition, QAM mapper 340 can be configured to use other suitable mapping methods known to those skilled in the art to map the received symbol-transition points onto the constellation points of the 2D decision map.

By performing the above-described two functions, QAM mapper 340 substantially transforms the received streams of phase and amplitude differentials into a stream of logical values representing the constellation points of the 2D decision map. This stream of logical values is applied to decoder 342, which is configured to recover from that stream the original bit sequence X(n) (see also FIG. 2). More specifically, decoder 342 converts each logical value received from QAM mapper 340 into a corresponding binary value assigned to a set of symbol transitions of the QAM constellation (e.g., one of the constellations shown in FIGS. 1A-C) having the requisite amplitude and phase increments. Note that the differential nature of the encoding algorithm makes it unnecessary to determine the exact QAM symbols carried by the communication signal because the encoded data can unequivocally be recovered by correctly ascertaining only the respective amplitude and phase increments for each QAM-symbol pair, and not the exact QAM-symbol pair that produced those increments.

Figure 4B:
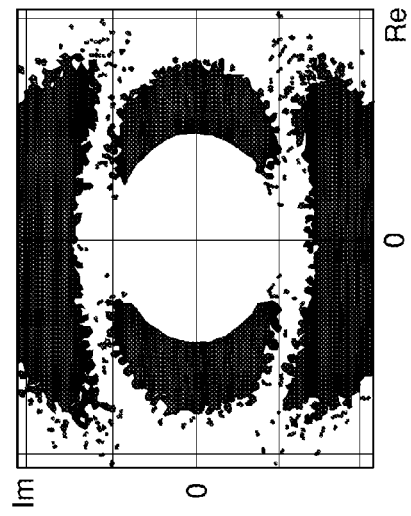
FIGS. 4A-C graphically illustrate the operation of the DP shown in FIG. 3 when the communication system of FIG. 2 is configured to transmit data using the 4-QAM constellation of FIG. 1A.
Figure 4A:
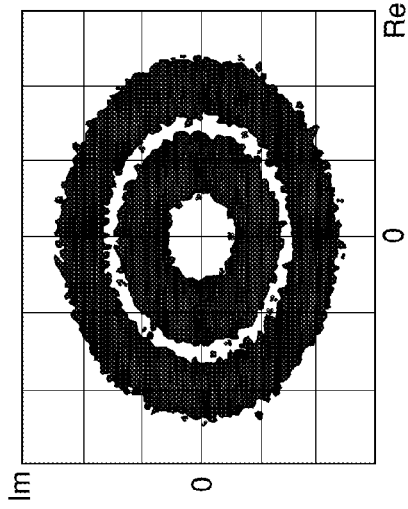
Figure 4C:
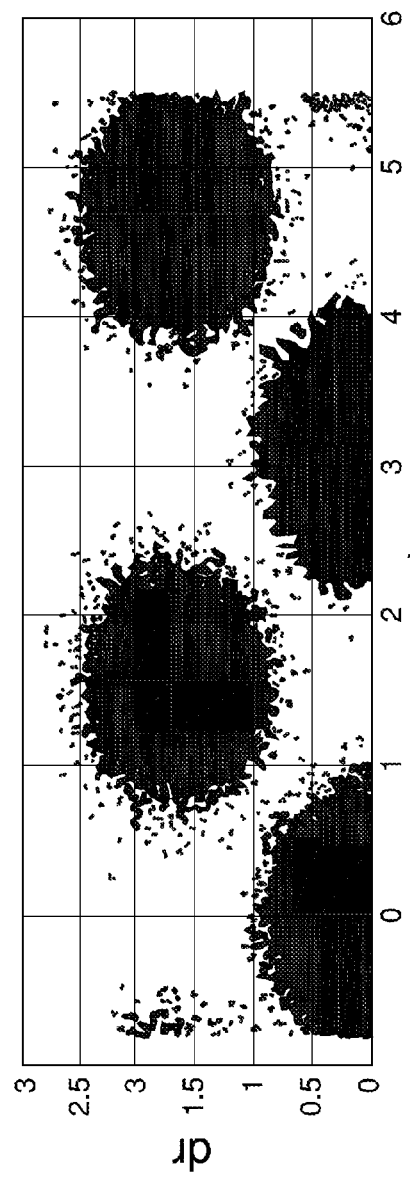

FIGS. 4A-C graphically illustrate the operation of DP 350 when communication system 200 is configured to transmit data using the 4-QAM constellation of FIG. 1A. More specifically, the data shown in FIGS. 4A-C correspond to a system configuration, in which the data transmission rate is 10 GBaud/s, the frequency offset ($\Delta\omega$) is 1 GHz, the optical-source linewidth is 100 MHz, the signal-to-noise ratio (SNR) is 15.3 dB, and the bit-error rate (BER) is $1.5 \times 10^{-5}$.

FIG. 4A graphically shows the symbol-point distribution corresponding to signals 248a-b (FIG. 2) or 348a-b (FIG. 3). As already explained above, the presence of a non-zero frequency offset between optical sources 212 and 232 causes the symbol points applied to DP 250 or 350 to form two circular bands, each representing a respective layer of the QAM constellation.

FIG. 4B graphically illustrates the data corresponding to the data of FIG. 4A after the phase drift associated with the non-zero frequency offset and the accumulated linewidth-induced phase noise are removed. As seen in FIG. 4B, removal of the phase drift and linewidth-induced phase noise differentiates the circular bands of FIG. 4A into four clusters.

FIG. 4C illustrates the process of constructing a 2D decision map implemented in QAM mapper 340. More specifically, the data of FIG. 4A are processed by amplitude differentiator 310, angular differentiator 320, and angular adjustor 330 and the processing results are applied to QAM mapper 340, where these processing results are transformed by plotting each symbol-transition point on a 2D plane using the point's folded phase differential value as the abscissa and its absolute amplitude-differential value as the ordinate. Note that four symbol-transition-point clusters are evident in FIG. 4C. The center of mass of each such cluster represents the respective constellation point of the 2D decision map. After the coordinates of the constellation points on the 2D decision map have been determined, QAM mapper 340 maps each subsequently received symbol-transition point onto one of those constellation points and outputs the corresponding logical value to decoder 342, which then recovers the encoded data.

Figure 5A:
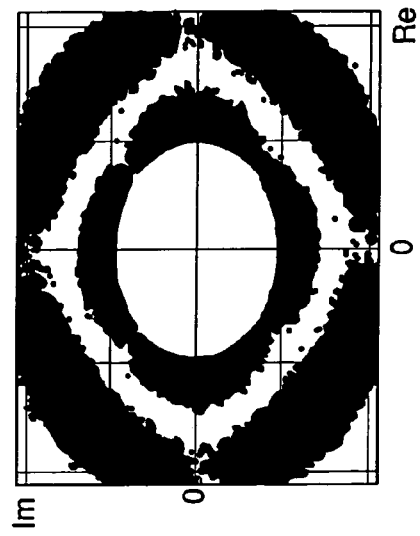
FIGS. 5A-C graphically illustrate the operation of the DP shown in FIG. 3 when the communication system of FIG. 2 is configured to transmit data using the 8-QAM constellation of FIG. 1B.
Figure 5B:
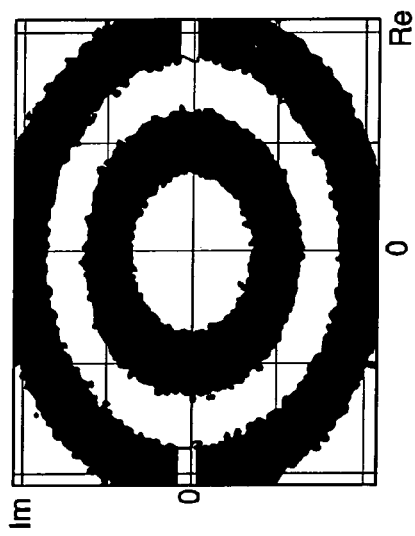
Figure 5C:
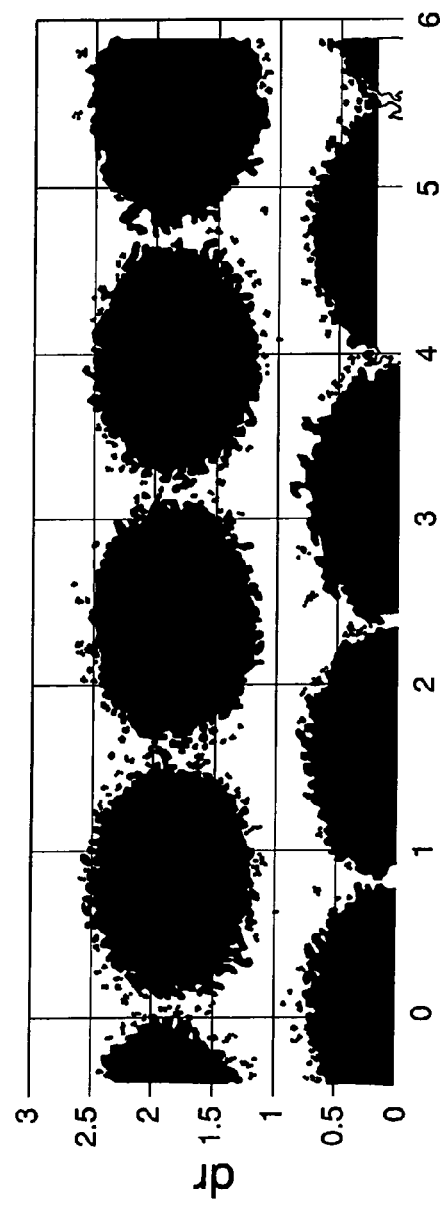

FIGS. 5A-C graphically illustrate the operation of DP 350 when communication system 200 is configured to transmit data using the 8-QAM constellation of FIG. 1B. More specifically, the data shown in FIGS. 5A-C correspond to a system configuration, in which the data transmission rate is 10 GBaud/s, $\Delta\omega=1$ GHz, the optical-source linewidth is 50 MHz, SNR=20.1 dB, and BER=$2 \times 10^{-5}$.

FIG. 5A graphically shows the symbol-point distribution corresponding to signals 248a-b (FIG. 2) or 348a-b (FIG. 3). Similar to FIG. 4A, a non-zero frequency offset between optical sources 212 and 232 manifests itself in the formation of two circular bands representing the layers of the 8-QAM constellation.

FIG. 5B graphically illustrates the data corresponding to the data of FIG. 5A after the phase drift associated with the non-zero frequency offset and the accumulated linewidth-induced phase noise are removed. As seen in FIG. 5B, removal of the phase drift and linewidth-induced phase noise differentiates the circular bands of FIG. 5A into eight clusters.

FIG. 5C illustrates the process of constructing a 2D decision map implemented in QAM mapper 340. More specifically, the data of FIG. 5A are processed by amplitude differentiator 310, angular differentiator 320, and angular adjustor 330 and the processing results are applied to QAM mapper 340, where these processing results are transformed by plotting each symbol-transition point on a 2D plane using the point's folded phase differential value as the abscissa and its absolute amplitude-differential value as the ordinate. Note that, after taking into account the wrap-around effect for two borderline clusters, eight symbol-transition-point clusters are evident in FIG. 5C. The center of mass of each such cluster represents the respective constellation point of the 2D decision map. After the coordinates of the constellation points on the 2D decision map have been determined, QAM mapper 340 maps each subsequently received symbol-transition point onto one of those constellation points and outputs the corresponding logical value to decoder 342, which then recovers the encoded data.

Figure 6A:
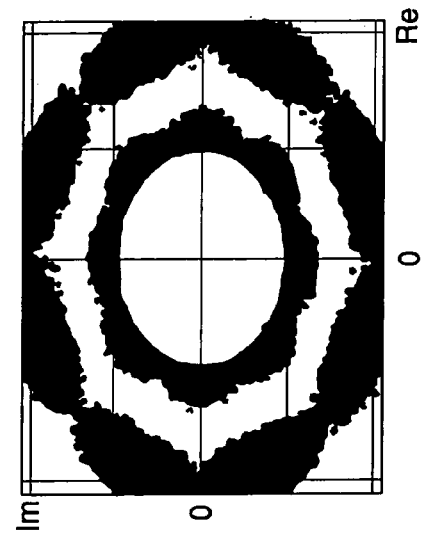
FIGS. 6A-C graphically illustrate the operation of the DP shown in FIG. 3 when the communication system of FIG. 2 is configured to transmit data using the 16-QAM constellation of FIG. 1C.
Figure 6B:
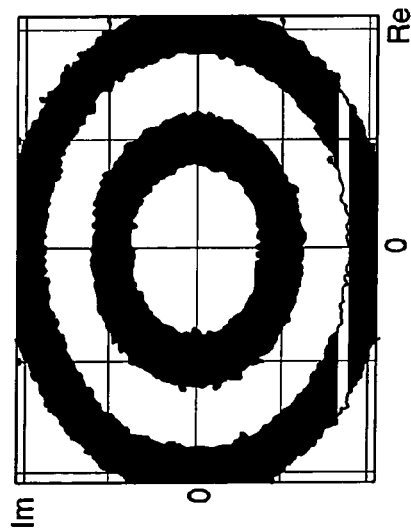
Figure 6C:
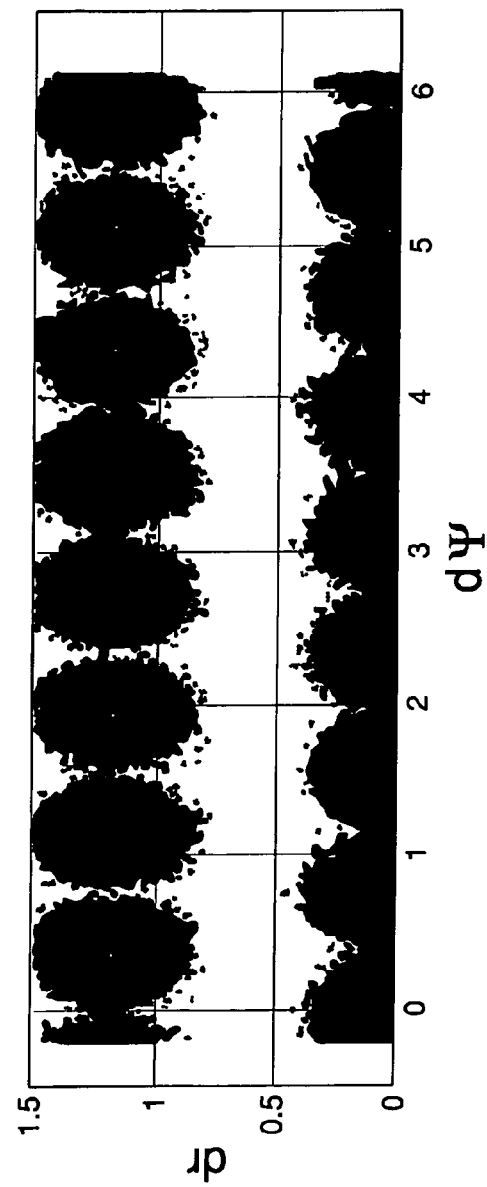

FIGS. 6A-C graphically illustrate the operation of DP 350 when communication system 200 is configured to transmit data using the 16-QAM constellation of FIG. 1C. More specifically, the data shown in FIGS. 6A-C correspond to a system configuration, in which the data transmission rate is 10 GBaud/s, $\Delta\omega=1$ GHz, the optical-source linewidth is 10 MHz, SNR=22 dB, and BER=$8.3 \times 10^{-5}$.

FIG. 6A graphically shows the symbol-point distribution corresponding to signals 248a-b (FIG. 2) or 348a-b (FIG. 3). Similar to FIGS. 4A and 5A, a non-zero frequency offset between optical sources 212 and 232 manifests itself in the formation of two circular bands representing the layers of the 16-QAM constellation.

FIG. 6B graphically illustrates the data corresponding to the data of FIG. 6A after the phase drift associated with the non-zero frequency offset and the accumulated linewidth-induced phase noise are removed. As seen in FIG. 6B, removal of the phase drift and linewidth-induced phase noise differentiates the circular bands of FIG. 6A into sixteen clusters.

FIG. 6C illustrates the process of constructing a 2D decision map implemented in QAM mapper 340. More specifically, the data of FIG. 6A are processed by amplitude differentiator 310, angular differentiator 320, and angular adjustor 330 and the processing results are applied to QAM mapper 340, where these processing results are transformed by plotting each symbol-transition point on a 2D plane using the point's folded phase differential value as the abscissa and its absolute amplitude-differential value as the ordinate. Note that, after taking into account the wrap-around effect for two borderline clusters, sixteen symbol-transition-point clusters are evident in FIG. 6C. The center of mass of each such cluster represents the respective constellation point of the 2D decision map. After the coordinates of the constellation points on the 2D decision map have been determined, QAM mapper 340 maps each subsequently received symbol-transition point onto one of those constellation points and outputs the corresponding logical value to decoder 342, which then recovers the encoded data.

Figure 7:
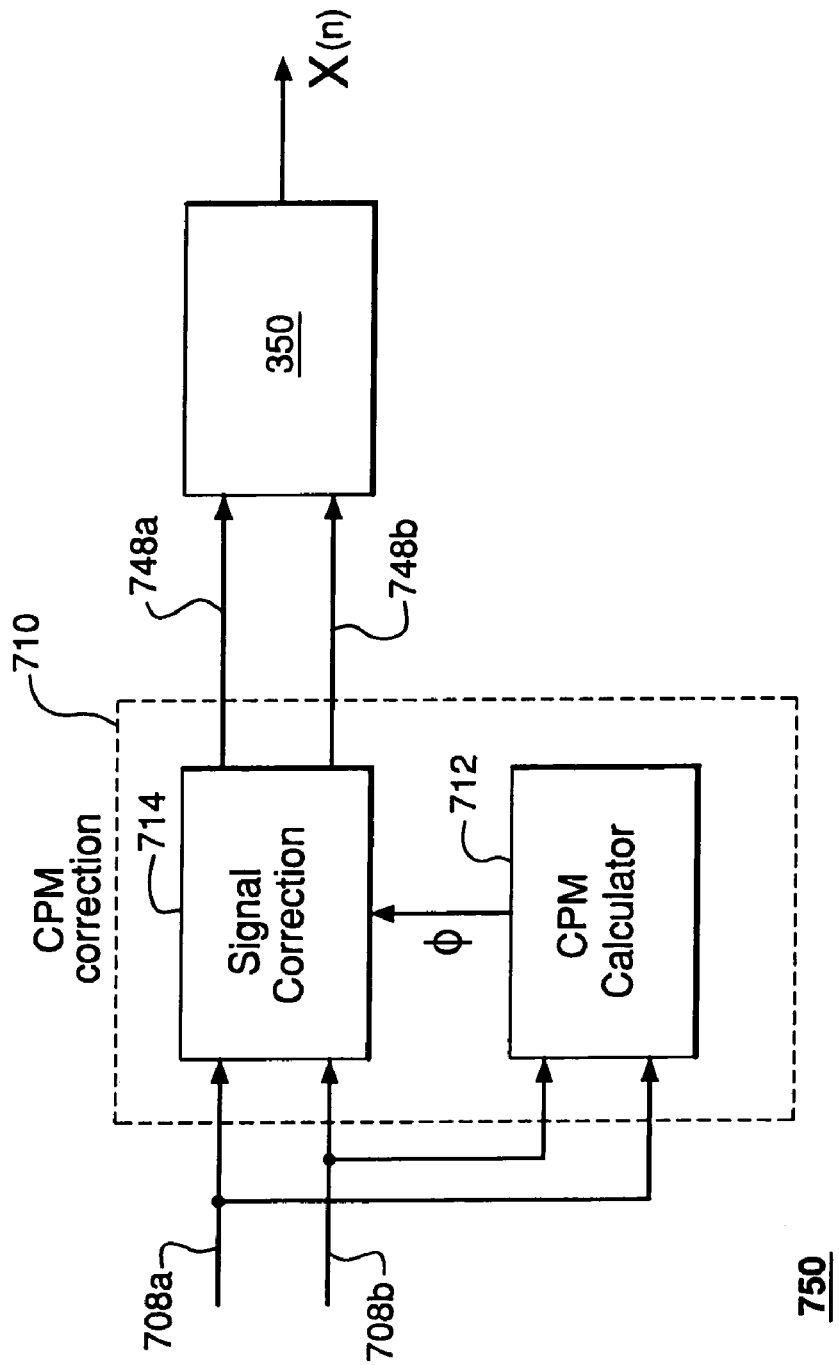
FIG. 7 shows a block diagram of a DP that can be used in the communication system of FIG. 2 according to another embodiment of the invention.

FIG. 7 shows a block diagram of a DP 750 that can be used as DP 250 according to another embodiment of the invention. In the foregoing description of DP 350, it is implicit that OPS 238 (FIG. 2) introduces a phase shift that is substantially 90 degrees, without significant (e.g., exceeding 15 degrees) deviations from that value. However, in certain embodiments of system 200, OPS 238 might have imperfections resulting in a deviation of the introduced phase shift from the desired 90 degrees. Such deviation is often referred to as the conjugate phase misalignment (CPM). If the value of CPM is relatively large, then the processing implemented in DP 350 might produce erroneous results. In contrast, the use of DP 750 in system 200 in place of DP 250 enables receiver 230 to recover the transmitted data even in the presence of relatively large CPM. DP 750 can generally be used for processing communication signals having any amount of CPM, including those having substantially no CPM.

DP 750 incorporates an instance of DP 350, which is preceded in DP 750 by a correction block 710. DP 750 is configured to receive digital input signals 708*a-b* that are analogous to, e.g., digital signals 248*a-b* (see FIG. 2), respectively, produced in receiver 230 in the presence of CPM. Signals 708*a-b* are applied to correction block 710, which determines the amount of CPM in those signals and transforms them into signals 748*a-b* that would substantially be produced in receiver 230 in the absence of CPM. Signals 748*a-b* are then applied to DP 350, where these signals are processed substantially as described above to recover the original bit sequence X(n).

To illustrate the data processing implemented in correction block 710, let us suppose that, in the absence of CPM, signals 708*a-b* are described by Eqs. (6):

$$y_{708a}(n) = \text{Re} A_B(n) e^{j(\Phi_W + \Delta\omega nT)} \equiv \rho_i(n) \quad (6a)$$

$$y_{708b}(n) = \text{Im} A_B(n) e^{j(\Phi_W + \Delta\omega nT)} \equiv \rho_q(n) \quad (6b)$$

where $y_{708a}(n)$ and $y_{708b}(n)$ are the values of signals 708*a-b*, respectively, in the n-th time slot; $A_B(n)$ is the respective constellation symbol; $\Phi_W = \Phi_S + \Phi_{LO}$, where $\Phi_S$ is the linewidth-related phase noise in the communication signal (e.g., signal 228) and $\Phi_{LO}$ is the linewidth-related phase noise in the LO signal (e.g., signal 234); $\Delta\omega = \omega_{LO} - \omega_S$, and T is the symbol period. In the presence of CPM, signal 708*b* is distorted to become:

$$y_{708b}(n)' = \rho_i(n) \sin\phi + \rho_q(n) \cos\phi \equiv \rho'_q(n) \quad (7)$$

where $\phi$ is the value of CPM. Making the substitution given by Eqs. (8), $$u = \sqrt{2}(\rho_i + \rho'_q) \quad (8a)$$

$$v = \sqrt{2}(\rho'_q - \rho_i) \quad (8b)$$

one finds that the following is true:

$$\frac{u^2}{\rho^2(1+\sin\phi)} + \frac{v^2}{\rho^2(1-\sin\phi)} = 1 \quad (9)$$

where $\rho^2 = \rho_i^2 + \rho_q^2$. Since Eq. (9) is an equation of an ellipse, it implies that one effect of CPM on data processing is that the CPM transforms the generally circular QAM layer bands shown, e.g., in FIGS. 4A, 5A, and 6A, into generally elliptical bands having their ellipse axes oriented at 45 degrees with respect to the coordinate axes of the complex plane.

In one embodiment, correction block 710 has a CPM calculator 712 and a signal corrector 714. CPM calculator 712 is configured to determine the value of $\phi$ and supply the determined value to signal corrector 714. For example, in one embodiment, CPM calculator 712 accumulates a relatively large number of symbol points that are sufficient to form the above-mentioned elliptical bands representing the QAM constellation layers. CPM calculator 712 then fits each of those bands using, e.g., Eq. (9), and determines the value of $\phi$ from the fit results. Using the value of $\phi$ determined by CPM calculator 712, signal corrector 714 then transforms signals 708*a-b* into signals 748*a-b*, respectively. For example, in one embodiment, signal corrector 714 determines the value of $\rho_i(n)$ using signal 708*a* and outputs that value as signal 748*a*. Signal corrector 714 also determines the value of $\rho_q(n)$ and outputs that value as signal 748*b*, with the value of $\rho_q(n)$ determined using: (i) signal 708*b*, (ii) the value of $\phi$ received from CPM calculator 712, (iii) the determined value $\rho_i(n)$, and (iv) Eq. (7).

In yet another embodiment, correction block 710 can be modified to correct an aggregate crosstalk between the I (in-phase) and Q (quadrature-phase) signal components as well as certain other signal imperfections, e.g., originating at the transmitter and/or in the communication link. For example, let us suppose that signals 708*a-b* are distorted as follows:

$$y_{708}(n)' = y_{708a}(n) + jy_{708b}(n) = (\rho_i - \delta_i) + j[\beta(\rho_i \sin\phi + \rho_q \cos\phi) - \delta_q] \quad (10)$$

where $\delta_i$ and $\delta_q$ are the offsets of the undistorted I (i.e., $\rho_i$) and Q (i.e., $\rho_q$) signal components, respectively; $\beta$ is the relative scaling distortion of the I and Q signal components; and $\phi$ is the aggregate crosstalk value, which is equivalent to CPM when the offsets are zero and $\beta = 1$ (see also Eq. (7)). The data described by Eq. (10) generally form an elliptical band that can be described by Eqs. (11):

$$ay_{708a}^2 + by_{708a}y_{708b} + cy_{708b}^2 + dy_{708a} + ey_{708b} + f = 0 \quad (11a)$$

-continued where:

$$\beta = 1/\sqrt{c} \quad (11b)$$

$$\sin\phi = -b\beta/2 \quad (11c)$$

$$\delta_q = \frac{2e - bd}{4c - b^2} \quad (11d)$$

$$\delta_i = d - \delta_q b \quad (11e)$$

Correction block 710 is configured to accumulate a relatively large number of symbol points that are sufficient to form the elliptical band(s) described by Eqs. (11). Correction block 710 then fits each of those bands using Eq. (11a), and determines parameter values a, b, c, d, and e from the fit results. Using these parameter values, correction block 710 then calculates the values of $\delta_i$, $\delta_q$, $\beta$, and $\phi$ using Eqs. (11b-11e). Finally, correction block 710 uses these calculated values to remove the above-specified distortions and produce the undistorted I ($\rho_i$) and Q ($\rho_q$) signal components as signals 748a-b, respectively. In one configuration, the processing described by Eqs. (10-11) can be performed off-line, e.g., during a calibration procedure. Alternatively or in addition, correction block 710 can be configured to send the estimated distortion parameters back to transmitter 210 and OPS 238 (see FIG. 2) to fine tune their respective configurations to reduce the amounts of signal distortion.

While this invention has been described with reference to illustrative embodiments, this description is not intended to be construed in a limiting sense. For example, different QAM constellations having different numbers of layers and/or constellation symbols can similarly be used in other configurations of communication system 200. Various modifications of the described embodiments, as well as other embodiments of the invention, which are apparent to persons skilled in the art to which the invention pertains are deemed to lie within the principle and scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Embodiments of the present invention may be implemented as circuit-based processes, including possible implementation on a single integrated circuit. As would be apparent to one skilled in the art, various functions of circuit elements may also be implemented as processing steps in a software program. Such software may be employed in, for example, a programmable digital signal processor, micro-controller, or general-purpose computer.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

I claim:

1. A receiver for an optical quadrature-amplitude modulation (QAM) signal, comprising:
   an optical detector having an optical source adapted to generate an optical local oscillator (LO) signal, said optical detector adapted to mix said optical QAM signal with said optical LO signal to produce first and second digital measures of the QAM signal, wherein the first and second digital measures correspond to different phases of the optical LO signal; and
   a digital processor coupled to the optical detector and adapted to process the first and second digital measures in response to a time-varying phase offset between a carrier frequency of the QAM signal and the optical LO signal to recover data encoded in the optical QAM signal, wherein the digital processor is adapted to recover said data when the optical LO signal has a frequency offset with respect to said carrier frequency.

2. The invention of claim 1, wherein the optical detector comprises:
   a first optical mixer adapted to mix a first copy of the optical QAM signal with a first copy of the optical LO signal to produce at least a first interference signal;
   a second optical mixer adapted to mix a second copy of the optical QAM signal with a second copy of the optical LO signal to produce at least a second interference signal, wherein the optical detector is adapted to produce the first and second copies of the optical LO signal such that said first and second copies are phase-shifted with respect to each other;
   a first photodetector coupled to the first optical mixer and adapted to measure an intensity of the first interference signal;
   a second photodetectors coupled to the second optical mixer and adapted to measure an intensity of the second interference signal;
   a first analog-to-digital converter (ADC) coupled to at least the first photodetector and adapted to convert the measurement results produced by at least said first photodetector into the first digital measure; and
   a second ADC coupled to at least the second photodetector and adapted to convert the measurement results produced by at least said second photodetector into the second digital measure.

3. The invention of claim 1, wherein a phase difference between said different phases of the optical LO signal is between 75 and 105 degrees.

4. The invention of claim 1, wherein:
   in response to a phase difference between said different phases of the optical LO signal that deviates from 90 degrees due to conjugate phase misalignment (CPM), the digital processor is adapted to adjust at least one of the first and second digital measures to substantially remove a CPM-associated distortion from said at least one digital measure.

5. The invention of claim 4, wherein the digital processor comprises:
a CPM calculator adapted to numerically fit an elliptical band formed from a selected number of QAM symbols using the first and second digital measures to determine an amount of CPM; and
a signal corrector adapted to receive said determined amount from the CPM calculator and adjust said at least one digital measure based on said determined amount.

6. The invention of claim 1, wherein the digital processor is adapted to recover data encoded using transitions between symbols of a multi-layered QAM constellation.

7. The invention of claim 1, wherein the digital processor comprises:
a differentiator circuit adapted to determine an amplitude differential and a phase differential for a QAM-symbol transition based on the first and second digital measures;
an angular adjustor coupled to the differentiator circuit and adapted to adjust the determined phase differential for an amount of phase drift associated with the time-varying phase offset;
a mapping circuit coupled to the differentiator circuit and the angular adjustor and adapted to map the QAM-symbol transition onto a constellation point of a 2D decision map using the determined amplitude differential and the adjusted phase differential; and
a decoder coupled to the mapping circuit and adapted to generate a portion of the data corresponding to the QAM-symbol transition based on a binary value assigned to said constellation point.

8. The invention of claim 7, wherein the mapping circuit is adapted to:
identify symbol-transition-point clusters from a selected number of QAM-symbol transitions using the determined amplitude differentials and the adjusted phase differentials; and
for each cluster, determine the cluster's center of mass to determine coordinates of a corresponding constellation point of the 2D decision map.

9. The invention of claim 7, wherein the angular adjustor is adapted to estimate a frequency offset corresponding to the time-varying phase offset based on an average phase differential for a sequence of QAM-symbol transitions.

10. The invention of claim 7, wherein the differentiator circuit is adapted to:
for each QAM symbol, determine a respective phase and a respective amplitude based on the first and second digital measures; and
for two consecutive QAM symbols, determine: (i) the respective phase differential by subtracting the phase of a leading QAM symbol from the phase of a trailing QAM symbol and (ii) the respective amplitude differential by subtracting the amplitude of said leading QAM symbol from the amplitude of said trailing QAM symbol.

11. The invention of claim 1, wherein, in response to distortions of the first and second digital measures due to at least one of (i) a crosstalk between in-phase and quadrature-phase components of the QAM signal and (ii) signal imperfections originating at a transmitter of said QAM signal or a communication link between said transmitter and the receiver, the digital processor is adapted to:
numerically fit an elliptical band formed from a selected number of QAM symbols using the first and second digital measures to quantify said distortions;
adjust at least one of the first and second digital measures based on the quantified distortions; and
recover the data based on said adjusted digital measures.

12. The invention of claim 1, wherein the optical LO signal is not phase locked to said carrier frequency.

13. The invention of claim 1, wherein the digital processor is adapted to recover said data when the optical QAM signal corresponds to a QAM constellation having two or more layers, wherein each of said layers has a different respective amplitude.

14. A method of processing an optical quadrature-amplitude modulation (QAM) signal, comprising:
(A) mixing said optical QAM signal with an optical local oscillator (LO) signal to produce first and second digital measures of the QAM signal, wherein the first and second digital measures correspond to different phases of the optical LO signal;
(B) processing the first and second digital measures in response to a time-varying phase offset between a carrier frequency of the QAM signal and the optical LO signal to recover data encoded in the optical QAM signal; and
(C) recovering said data when the optical LO signal has a frequency offset with respect to said carrier frequency.

15. The invention of claim 14, wherein step (A) comprises:
mixing a first copy of the optical QAM signal with a first copy of the optical LO signal to produce the first digital measure; and
mixing a second copy of the optical QAM signal with a second copy of the optical LO signal to produce the second digital measure, wherein the first and second copies of the optical LO signal are phase-shifted with respect to each other.

16. The invention of claim 15, wherein the phase shift between the first and second copies of the optical LO signal is between 75 and 105 degrees.

17. The invention of claim 15, wherein:
the phase shift between the first and second copies of the optical LO signal deviates from 90 degrees due to conjugate phase misalignment (CPM); and
step (B) comprises the step of adjusting at least one of the first and second digital measures to substantially remove a CPM-associated distortion from said at least one digital measure.

18. The invention of claim 17, wherein the step of adjusting comprises:
numerically fitting an elliptical band formed from a selected number of QAM symbols using the first and second digital measures to determine an amount of CPM; and
adjusting said at least one digital measure based on the determined amount.

19. The invention of claim 14, wherein the data are encoded using transitions between symbols of a multi-layered QAM constellation.

20. The invention of claim 14, wherein step (B) comprises:
determining an amplitude differential and a phase differential for a QAM-symbol transition based on the first and second digital measures;
adjusting the determined phase differential for an amount of phase drift associated with the time-varying phase offset;
mapping the QAM-symbol transition onto a constellation point of a 2D decision map using the determined amplitude differential and the adjusted phase differential; and
generating a portion of the data corresponding to the QAM-symbol transition based on a binary value assigned to said constellation point.

21. The invention of claim 20, wherein step (B) comprises:
identifying symbol-transition-point clusters formed from a selected number of QAM-symbol transitions using the respective determined amplitude differentials and the respective adjusted phase differentials; and
for each cluster, determining the cluster's center of mass to determine coordinates of a corresponding constellation point of the 2D decision map.

22. The invention of claim 20, wherein step (B) comprises estimating a frequency offset corresponding to the time-varying phase offset based on an average phase differential for a sequence of QAM-symbol transitions.

23. The invention of claim 14, wherein the optical LO signal is not phase locked to said carrier frequency.

24. The invention of claim 14, wherein the optical QAM signal corresponds to a QAM constellation having two or more layers, wherein each of said layers has a different respective amplitude.

25. A receiver for an optical quadrature-amplitude modulation (QAM) signal, comprising:
an optical detector adapted to mix the optical QAM signal with an optical local oscillator (LO) signal to produce first and second digital measures of the QAM signal;
a differentiator circuit coupled to the optical detector and adapted to determine an amplitude differential and a phase differential for a QAM-symbol transition based on the first and second digital measures;
an angular adjustor coupled to the differentiator circuit and adapted to adjust the determined phase differential in response to a time-varying phase offset between a carrier frequency of the QAM signal and the optical LO signal; and
a decoding circuit coupled to the differentiator circuit and the angular adjustor and adapted to recover data encoded in the optical QAM signal based on the determined amplitude differential and the adjusted phase differential.

26. A receiver for an optical quadrature-amplitude modulation (QAM) signal, comprising:
an optical detector having an optical source adapted to generate an optical local oscillator (LO) signal, said optical detector adapted to mix said optical QAM signal with said optical LO signal to produce first and second digital measures of the QAM signal, wherein the first and second digital measures correspond to different phases of the optical LO signal; and
a digital processor coupled to the optical detector and adapted to process the first and second digital measures in response to a time-varying phase offset between a carrier frequency of the QAM signal and the optical LO signal to recover data encoded in the optical QAM signal, wherein the digital processor comprises a differentiator circuit adapted to determine an amplitude differential and a phase differential for a QAM-symbol transition based on the first and second digital measures.

27. The invention of claim 26, wherein the digital processor further comprises:
an angular adjustor coupled to the differentiator circuit and adapted to adjust the determined phase differential for an amount of phase drift associated with the time-varying phase offset;
a mapping circuit coupled to the differentiator circuit and the angular adjustor and adapted to map the QAM-symbol transition onto a constellation point of a 2D decision map using the determined amplitude differential and the adjusted phase differential; and
a decoder coupled to the mapping circuit and adapted to generate a portion of the data corresponding to the QAM-symbol transition based on a binary value assigned to said constellation point.

28. The invention of claim 27, wherein the mapping circuit is adapted to:
identify symbol-transition-point clusters from a selected number of QAM-symbol transitions using the determined amplitude differentials and the adjusted phase differentials; and
for each cluster, determine the cluster's center of mass to determine coordinates of a corresponding constellation point of the 2D decision map.

29. The invention of claim 27, wherein the angular adjustor is adapted to estimate a frequency offset corresponding to the time-varying phase offset based on an average phase differential for a sequence of QAM-symbol transitions.

30. The invention of claim 27, wherein the differentiator circuit is adapted to:
for each QAM symbol, determine a respective phase and a respective amplitude based on the first and second digital measures; and
for two consecutive QAM symbols, determine: (i) the respective phase differential by subtracting the phase of a leading QAM symbol from the phase of a trailing QAM symbol and (ii) the respective amplitude differential by subtracting the amplitude of said leading QAM symbol from the amplitude of said trailing QAM symbol.

31. A method of processing an optical quadrature-amplitude modulation (QAM) signal, comprising:
(A) mixing said optical QAM signal with an optical local oscillator (LO) signal to produce first and second digital measures of the QAM signal, wherein the first and second digital measures correspond to different phases of the optical LO signal; and
(B) processing the first and second digital measures in response to a time-varying phase offset between a carrier frequency of the QAM signal and the optical LO signal to recover data encoded in the optical QAM signal, wherein step (B) comprises determining an amplitude differential and a phase differential for a QAM-symbol transition based on the first and second digital measures.

32. The invention of claim 31, wherein step (B) comprises:
adjusting the determined phase differential for an amount of phase drift associated with the time-varying phase offset;
mapping the QAM-symbol transition onto a constellation point of a 2D decision map using the determined amplitude differential and the adjusted phase differential; and
generating a portion of the data corresponding to the QAM-symbol transition based on a binary value assigned to said constellation point.

33. The invention of claim 32, wherein step (B) comprises:
identifying symbol-transition-point clusters formed from a selected number of QAM-symbol transitions using the respective determined amplitude differentials and the respective adjusted phase differentials; and
for each cluster, determining the cluster's center of mass to determine coordinates of a corresponding constellation point of the 2D decision map.

34. The invention of claim 32, wherein step (B) comprises estimating a frequency offset corresponding to the time-varying phase offset based on an average phase differential for a sequence of QAM-symbol transitions.

* * * * *